United States Patent [19]

Bedford et al.

[11] Patent Number: 5,639,497
[45] Date of Patent: Jun. 17, 1997

[54] COOKING CONTROL SYSTEM FOR ROTISSERIE OVENS

[75] Inventors: James P. Bedford, Willoughby; Thomas J. Willis, Solon, both of Ohio; Mark H. Finck, Palm Harbor, Fla.

[73] Assignee: Cleveland Range, Inc., Cleveland, Ohio

[21] Appl. No.: 596,835

[22] Filed: Feb. 5, 1996

[51] Int. Cl.⁶ .................... A23L 1/00; A47J 27/00
[52] U.S. Cl. ............... 426/233; 99/331; 99/421 H; 99/421 P; 426/523
[58] Field of Search ..................... 426/233, 523; 99/326, 331, 421 R, 421 H, 421 P; 219/490

[56] References Cited

U.S. PATENT DOCUMENTS

| | | | |
|---|---|---|---|
| 4,481,394 | 11/1984 | Tanabe | 99/DIG. 14 |
| 4,782,445 | 11/1988 | Pasquini | 219/494 |
| 4,968,515 | 11/1990 | Burkett et al. | 426/233 |
| 5,044,262 | 9/1991 | Burkett et al. | 426/233 |
| 5,361,686 | 11/1994 | Koopman | 99/421 H |
| 5,473,977 | 12/1995 | Koether et al. | 99/421 P |

*Primary Examiner*—George Yeung
*Attorney, Agent, or Firm*—Ohlandt, Greeley, Ruggiero & Perle

[57] ABSTRACT

A cooking apparatus for automatically cooking and rotating a food product which comprises: a cooking chamber; a planetary assembly disposed within the cooking chamber which is capable of rotating the food product about the cooking chamber; a heater or burner disposed within the cooking chamber for cooking the food product; a venting damper disposed within the cooking chamber which is capable of releasing excess energy contained within the cooking chamber; a temperature sensor used for detecting the temperature in the cooking chamber; and a microprocessor which is capable of cooking the food product for a predetermined cooking time and maintaining the temperature in the cooking chamber in accordance with a predetermined cooking temperature by means of controlling the heater or burner and the venting damper such that the heater or burner remains in the "on" position during the entire cooking time while the venting damper is opened and closed as necessary to maintain the predetermined cooking temperature.

19 Claims, 11 Drawing Sheets

| | BURNER | | | | | DAMPER | | | FANS | | | PLANETARY | | | |
|---|---|---|---|---|---|---|---|---|---|---|---|---|---|---|---|
| | OFF | ON B.T.U. HIGH | ON B.T.U. LOW | ZERO | CYCLES TO CONTROL SET TEMP. | CLOSED | OPEN | CYCLES TO CONTROL SET TEMP. | CONVECTION AIR ON | OFF | CYCLE | ROTATION SPEED 1 RPM | 2 RPM | 3 RPM | STOPPED |
| PREHEAT/RECOVERY HEAT (STAND-BY) | | X | | | X | X | | | X | | | | | | X |
| DOOR OPEN (LOAD/UNLOAD) | X | | | | | DEFAULTS TO PRIOR OPERATION | | | | | | | | | X |
| ROTISSERIE ADVANCE (LOAD/UNLOAD) | | | | X | | DEFAULTS TO PRIOR OPERATION | | | | | | | | X | |
| STAGE 1 BAKING-RECOVERY | | P-1 | | | | X | | | X | | | | | P-1 | |
| STAGE 2 BAKING-RECOVERY ACHIEVED | | P-1 | | | | | | X | X | | | | P-1 | | |
| PRE-HOLD (FROM BAKE TEMP. TO HOLD TEMP.) | X | | | | | P-2 | | | X | | | X | | | |
| HOLD MODE | | | X | | X | | X | | | OFF | P-3 | X | | | |
| SET BACK TO 200°F (20 MINS. NON USE) | | | X | | X | | X | | X | | | X | | | |
| COOL DOWN | X | | | | | | X | | X | | | DEFAULTS TO PRIOR OPERATION | | | |

COOKING CONTROL SYSTEM FOR ROTISSERIE OVENS

The present invention relates generally to a control device used for cooking food products, such as meat or poultry, in rotisserie ovens. More particularly, the present invention relates to a programmable automatic control circuit for use with rotisserie ovens for the purpose of controlling the temperature within the cooking chamber during baking or cooking time periods by means of cycling a vent damper rather than cycling of the burner; thereby producing a cooked food product without a "pink" colored surface or which is soggy in texture.

BACKGROUND OF THE INVENTION

Rotisserie ovens typically utilize a single BTU input gas burner or heater means that is cycled between "on" and "off" positions in order to maintain the temperature of the cooking chamber at a predetermined level. Such cycling of the burner or heater means provides for the burner to be turned "off" when the temperature of the cooking chamber reaches a predetermined level and the burner to be turned "on" by re-ignition thereof when the temperature of the cooking chamber drops below that predetermined level One problem which the present inventors have associated with the use of the burner to control oven temperature during the baking or cooking of the food product is the generation of undesirable levels of carbon monoxide upon each re-ignition of the burner. It is known that carbon monoxide together with high moisture content causes the surface of certain food products, such as chicken, to become a highly undesirable "pink" color. Although a "pink" colored chicken may be fully cooked, its appearance is quite unappealing and could erroneously suggest to a potential consumer that the product is undercooked. This discoloration of food products is more prominent during early baking or cooking stages, since the food product has not developed a firm outer coating or shell which diminishes the penetration of carbon monoxide through the skin of the chicken and into the meat. It is the penetration of carbon monoxide within the food product that causes it to appear "pink" in color.

Control devices used to automatically cook food products within ovens are well known. Examples of such control devices are provided in U.S. Pat. No. 4,782,445 to Pasquini, which issued on Nov. 1, 1988; U.S. Pat. No. 4,968,515 to Burkett, et al., which issued on Nov. 6, 1990; and U.S. Pat. No. 5,044,262 to Burkett et al., which issued on Sep. 3, 1991.

The present inventors are not aware of any control devices for use with rotisserie ovens which are capable of protecting food products from discoloration due to carbon monoxide penetration through the skin and into the meat of the chicken during the baking or cooking stages, particularly the very early baking stages.

Conventional rotisserie ovens typically use a single low BTU input gas burner which has the disadvantage of creating a condition whereby there is inadequate energy early in the cooking process to recover the predetermined temperature level in the oven and, thus, browning of the product is under-developed. Also, at the end of the cooking process there could be too much energy and the food product can be burned or excessively darkened.

Another disadvantage with conventional rotisserie ovens is that they rotate food products during baking or cooking at a constant speed. Operating a planetary system disposed within a rotisserie oven at a constant rotational speed causes juices from within the food products to adhere to their outer surface, whereby localized surface cooling or light stripes are formed around the outer surfaces of the food products. These light stripes may affect the degree to which the food product is cooked due to the higher levels of moisture in those areas and also has a dramatic impact on the appearance of the food product to the consumer.

The present inventors have developed a unique rotisserie oven and operating protocol which avoids cooked food products having "pink" color, light stripes or burned or darkened appearance. The present inventors have accomplished this by providing a means for controlling the rotisserie oven, wherein the temperature of the cooking chamber during the baking or cooking stages is maintained by periodically venting the excess energy and atmosphere contained within the cooking chamber without the need to cycle the burner or heater by constantly re-igniting the burner during the baking or cooking stages. The elimination of burner cycling during the baking or cooking stages minimizes the production of carbon monoxide, thereby avoiding the production of "pink" chicken meat or the like.

The present inventors have also discovered that burnt or darkened food products can be avoided during the baking or cooking stages if the oven includes both high and low BTU burner input. The present inventors have discovered that high BTU input can be utilized to recover energy lost during the process when cold product is loaded into the oven with the door open. The food product (e.g., chicken) can tolerate high BTU input during the early stages due to the color of the food and relatively low temperature. The operating controller can be programmed to shift to low BTU input to brown the food product rather than burn it and to raise the internal meat temperature concurrently. The burner ignition process is always accomplished on high BTU input followed by either a continuation of high BTU input or low BTU input as predetermined by the preprogrammed computer control.

The present invention also provides for adjustable rotational speeds for the planetary assembly, thereby avoiding localized surface cooling and light stripes at the surface of the food product.

SUMMARY OF THE INVENTION

A cooking apparatus for automatically cooking and rotating a food product which comprises: a cooking chamber; a planetary assembly disposed within the cooking chamber which is capable of rotating the food product about the cooking chamber; a heating means disposed within the cooking chamber for cooking the food product; a venting means disposed within the cooking chamber which is capable of releasing excess energy contained within the cooking chamber; means for detecting the temperature in the cooking chamber; and control means which is capable of cooking the food product for a predetermined cooking time and maintaining the temperature in the cooking chamber in accordance with a predetermined cooking temperature by means of controlling the heating means and the venting means such that the heating means remains in the "on" position during the baking or cooking stage while the venting means is cycled between opened and closed positions, as necessary, to maintain the predetermined cooking temperature.

The heating means is an infrared gas burner which is capable of operating at an infrared wavelength of 3–4 microns at either 60,000 BTU/hour or greater (high BTU input) or at 50,000 BTU/hour or less (low BTU input). The heating means continuously radiates heat throughout the entire predetermined cooking time. In particular, the heating means is a gas-based heating mechanism that remains "on" during the entire time that the food product is being cooked such that re-ignition of the burner or heating means does not occur until the baking or cooking stage is completed. The heating means continuously emits infrared energy that is directed toward the food product and includes a heating element (e.g., a gas burner) and means for circulating air heated (e.g., convection fans) by the heating element throughout the cooking chamber.

The control means is a microprocessor which is electrically connected to the planetary assembly, heating means, venting means, and means for detecting a temperature in the cooking chamber. The microprocessor is preferably one which is capable of storing a predetermined cooking time and a predetermined temperature for various food products (i.e., cooking parameters).

The venting means comprises a solenoid, a damper shaft and a damper disposed within the cooking chamber. The microprocessor is electrically connected to the solenoid, whereby the damper is axially moveable about the damper shaft so that it can be moved to either an opened or closed position. A fully closed damper, as define herein, will continue to allow for an orifice opening so that it meets AGA standard requiring products of combustion to escape at all times from an oven.

The cooking apparatus also comprises a means for circulating heated air (i.e., convection air) within the cooking chamber. The means for circulating heated air is a convection fan which is electrically connected to the control means, whereby the control means is capable of turning the means for circulating heated air on and off.

The present invention also involves a process for automatically cooking and rotating a food product disposed within the above described cooking apparatus, wherein the process comprises the following steps: loading the food products onto at least one support member (e.g., a spit) which is rotatably connected to a planetary assembly within the cooking chamber; rotating the planetary assembly at a predetermined speed of rotation; and heating the cooking chamber to a predetermined cooking temperature and maintaining the predetermined cooking temperature within the cooking chamber for a predetermined cooking time by continuously generating heat from the heating means and periodically adjusting the venting means between an opened and closed position, wherein the opened position allows excess energy from the cooking chamber to escape therefrom in order to maintain the predetermined cooking temperature; whereby cycling of the heating means between on and off positions during the cooking time is eliminated.

The process may also include the step of preheating the cooking chamber to a predetermined preheat temperature prior to loading the cooking chamber with food products. The predetermined preheat temperature is maintained by cycling the heating means between on and off positions, while keeping the venting means in the closed position.

The process of the present invention also provides for the adjusting of the heating means between the high and low infrared wavelengths during the predetermined cooking time and the adjusting of the rotating speeds of the planetary assembly throughout the predetermined cooking time.

This process optionally comprising a step of circulating heated air about the cooking chamber during the predetermined cooking time.

DETAILED DESCRIPTION OF THE PREFERRED EMBODIMENT

Figure 1:
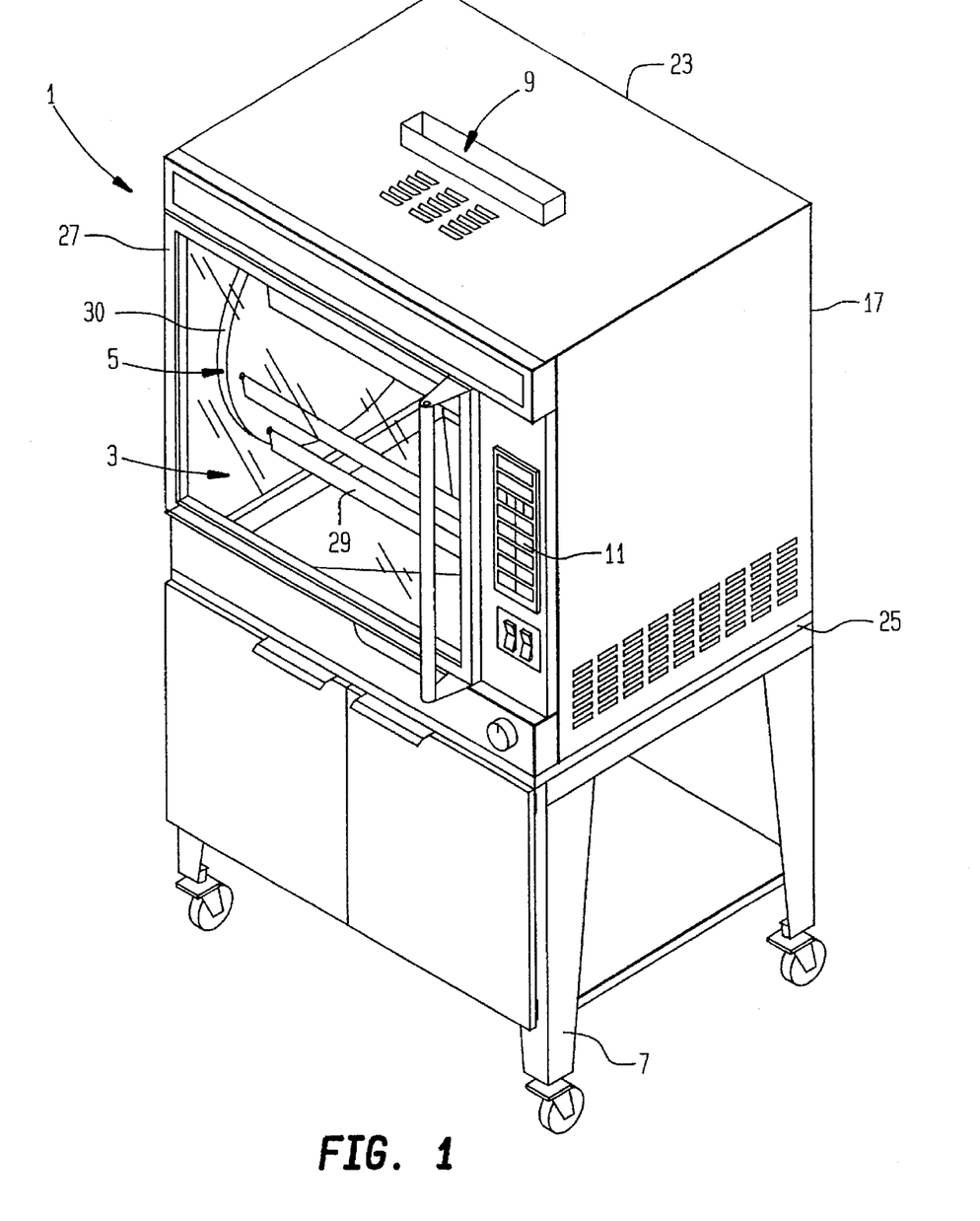
FIG. 1 is a top-front perspective view of the rotisserie oven of the present invention.
Figure 2:
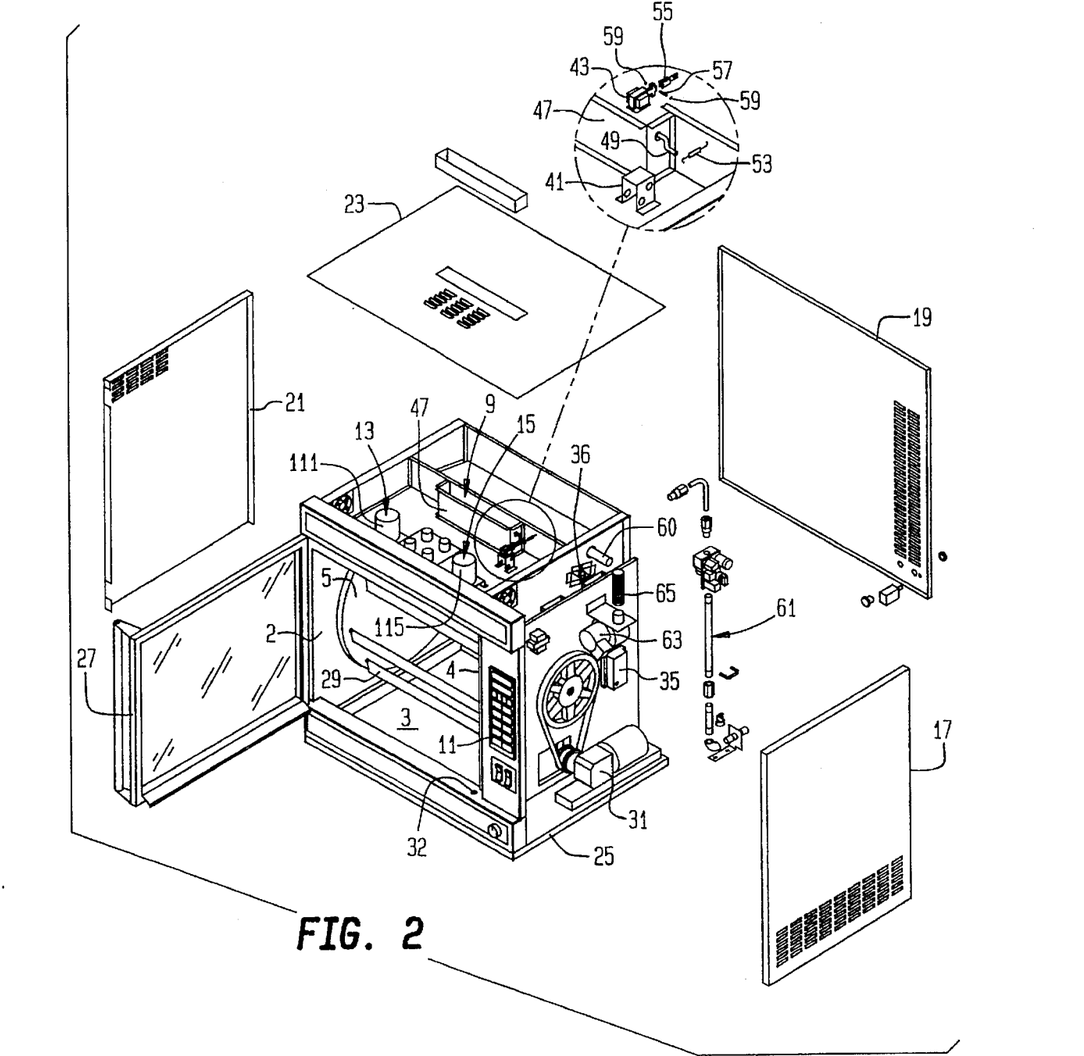
FIG. 2 is an exploded view of the rotisserie oven of FIG. 1.
Figure 3:
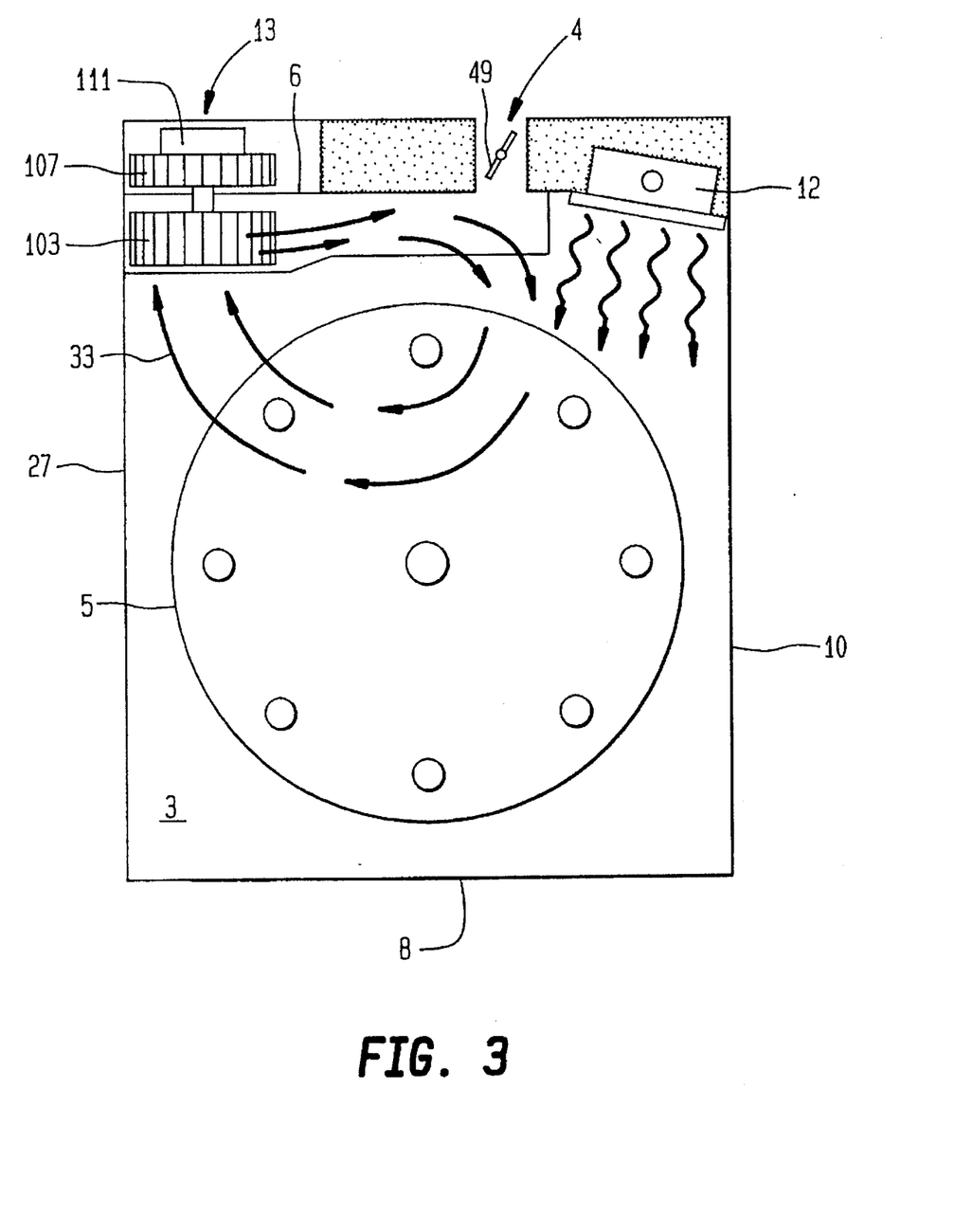
FIG. 3 is a schematic cross-sectional view of the cooking chamber, infrared burner, convection fan and venting damper according to the present invention.

Referring to the drawings and, in particular, to FIGS. 1–5, there is provided a rotisserie oven assembly 1 comprising a cooking chamber 3, a planetary assembly 5 disposed within cooking chamber 3, a stand 7, venting means 9, control means 11, heating means 12 (e.g., infrared burner), and circulating or convection fans 13 and 15. Cooking chamber 3 is disposed within rotisserie oven assembly 1 which has exterior side walls (17, 19, 21), exterior top 23, exterior bottom 25 and front glass door 27. As shown in FIGS. 1 and 3, cooking chamber 3 is formed between chamber side walls (2, 4, 10), a chamber top 6, a chamber bottom 8, and front glass door 27.

Rotisserie oven or grill 1 is used to cook food products, such as meat or poultry, positioned about a plurality of horizontally disposed skewers or spits 29 which rotate within cooking chamber 3 together with planetary assembly 5. D.C. motor 31 rotates planetary assembly 5 during various stages of the oven's operation. The food products are cooked by means of an infrared gas burner 12 disposed near chamber top 6 of cooking chamber 3 and circulating hot air 33 (indicated by arrows in FIG. 3) by means of dual counter rotating fans 13 and 15 also disposed about chamber top 6 of cooking chamber 3. An ignition module 35 and igniter 36 is secured through an opening at one side of the cooking chamber 3 adjacent to gas burner 12.

Figure 4:
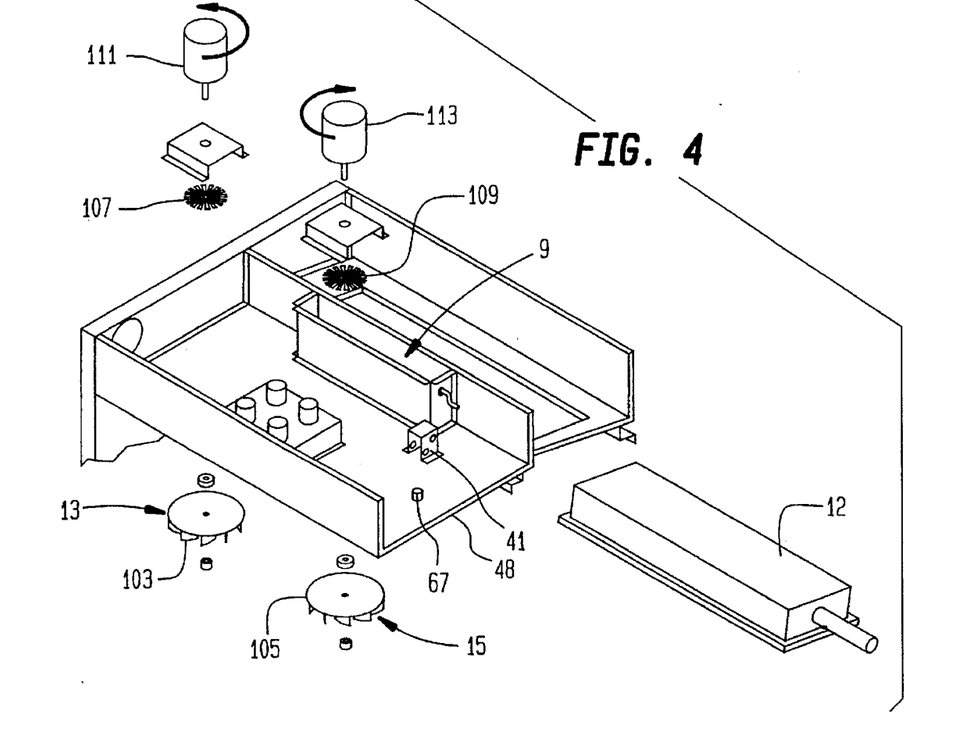
FIG. 4 is an exploded view of the top assembly of the rotisserie oven of FIG. 1 depicting the convection fans, venting damper and infrared burner.
Figure 5:
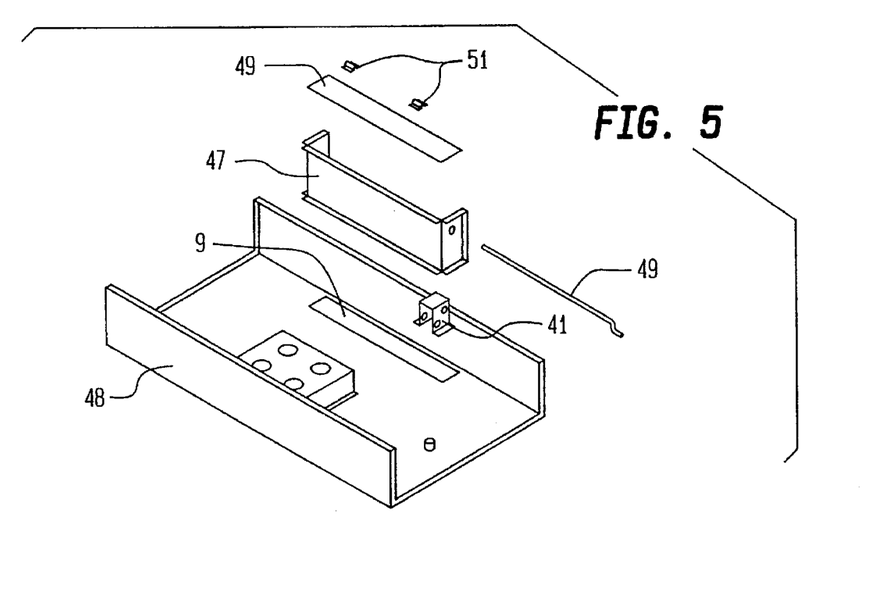
FIG. 5 is an exploded view of the venting damper of the upper assembly of FIG. 4.

Venting means 9, as shown in the cut-out in FIG. 2 and in FIGS. 4 and 5, comprises a bracket 41 for mounting of a solenoid 43, a riser assembly 47 disposed on top of liner assembly 48, and a damper or baffle assembly 49 disposed in riser assembly 47 and mounted about damper or baffle control rod 49 by means of damper control rod clamps 51. Solenoid 43 is mechanically connected to damper control rod 49 by means of a spring 53, link assembly 55, solenoid pin 57, and a pair of retainer rings 59.

Upon receiving an output signal from control means 11, solenoid 43 is activated such that damper control rod 49 is rotated about it axis, wherein damper assembly 49 is moved to either an opened or closed position within riser assembly 47. When damper assembly 49 is in the closed position it substantially blocks the flow of excess energy, i.e., the atmosphere from cooking chamber 3, as it attempts to exit cooking chamber 3 via riser assembly 47. Riser assembly 47 provides a passageway between cooking chamber 3 and the environment outside of oven 1. When damper assembly 49 is in the opened position it is substantially parallel to the side walls of riser assembly 47 such that it permits excess energy to readily exit cooking chamber 3 via riser assembly 47.

The exterior surface of the side walls of cooking chamber 3 are insulated, while the interior surface is coated with a chemical non-stick barrier. One such chemical non-stick barrier is Kote® which is made by Kay Chem. The use of a non-stick coating about the interior surfaces of the side walls, top portion and bottom portion of the cooking chamber is for the purpose of preventing fat sprayed from the cooking meat or poultry to char or burn on such surfaces by allowing the fat to readily slide down the coated surfaces into a fat drip pan disposed about the bottom of the cooking chamber, so as to allow the operator to easily wash out the oven at the end of the day.

As shown in FIG. 3, air contained within cooking chamber 3 can be circulated by means of fans 13 and 15 in such a manner that it is blown by means of fans 13 and 15 in front of infrared gas burner 12 where the air is heated and then passed over the food products disposed on rotating spits 29 for the purpose of cooking the food products. Circulating fans 13 and 15 are controlled by control means 11.

An air-gas mixture is delivered to burner 12 via gas conduit 60 which receives gas from gas conduit assembly 61 and air from blower 63 which is mixed within air-gas mixture duct 65. The ignition 35 and the flow of the air-gas mixture into burner 12 are controlled by control means 11.

A temperature sensor 67 is preferably disposed about chamber top 6 of cooking chamber 3 in order to detect the actual temperature of cooking chamber 3 at any time. Temperature sensor 67 is electrically connected to control means 11 for the purpose of allowing control means 11 to compare the temperature sensed by sensor 67 against a predetermined cooking temperature which is stored within a memory portion of control means 11.

Figure 6:
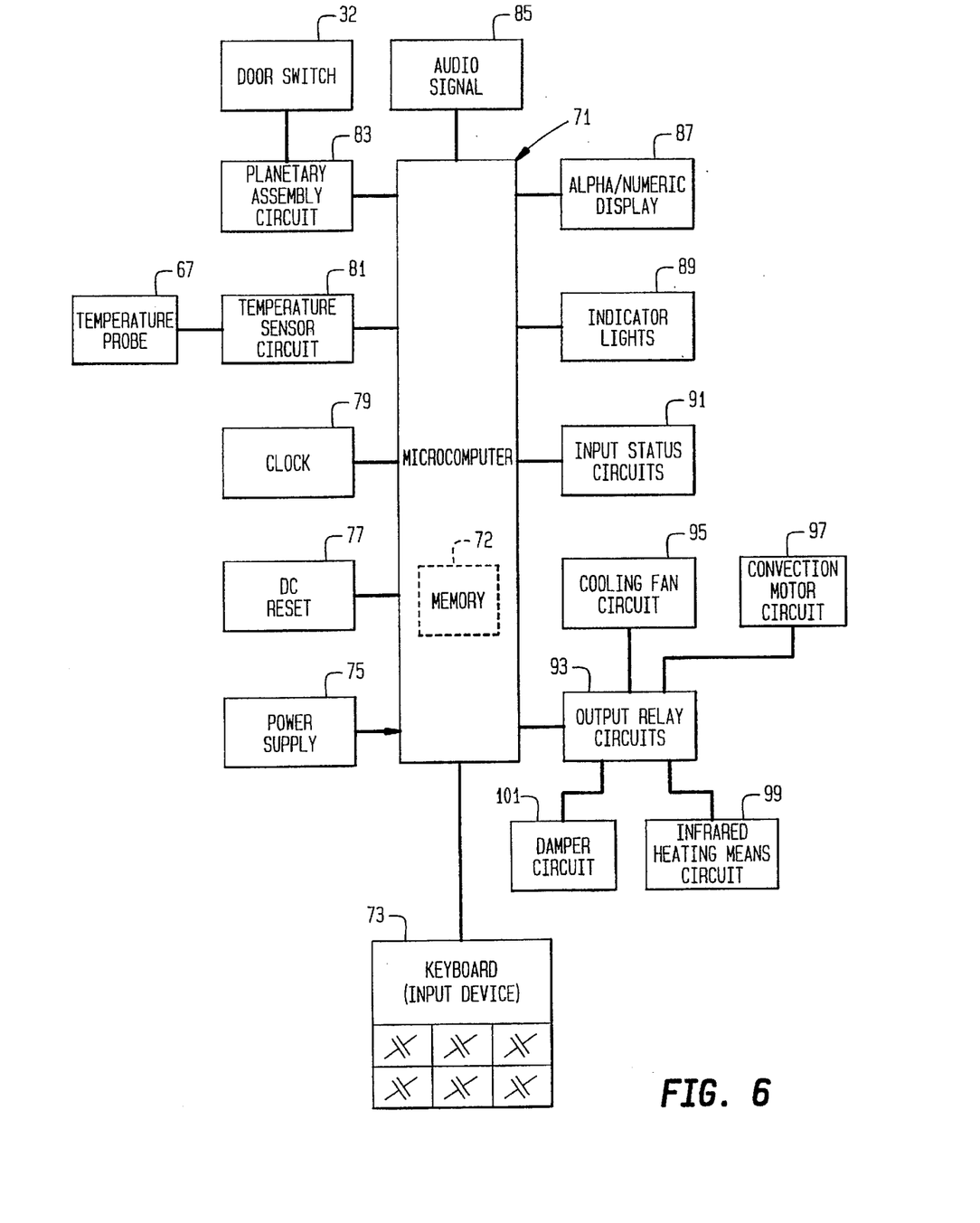
FIG. 6 is a block diagram of the control means of the present invention which includes a microprocessor and various subordinate circuits.
Figure 9:
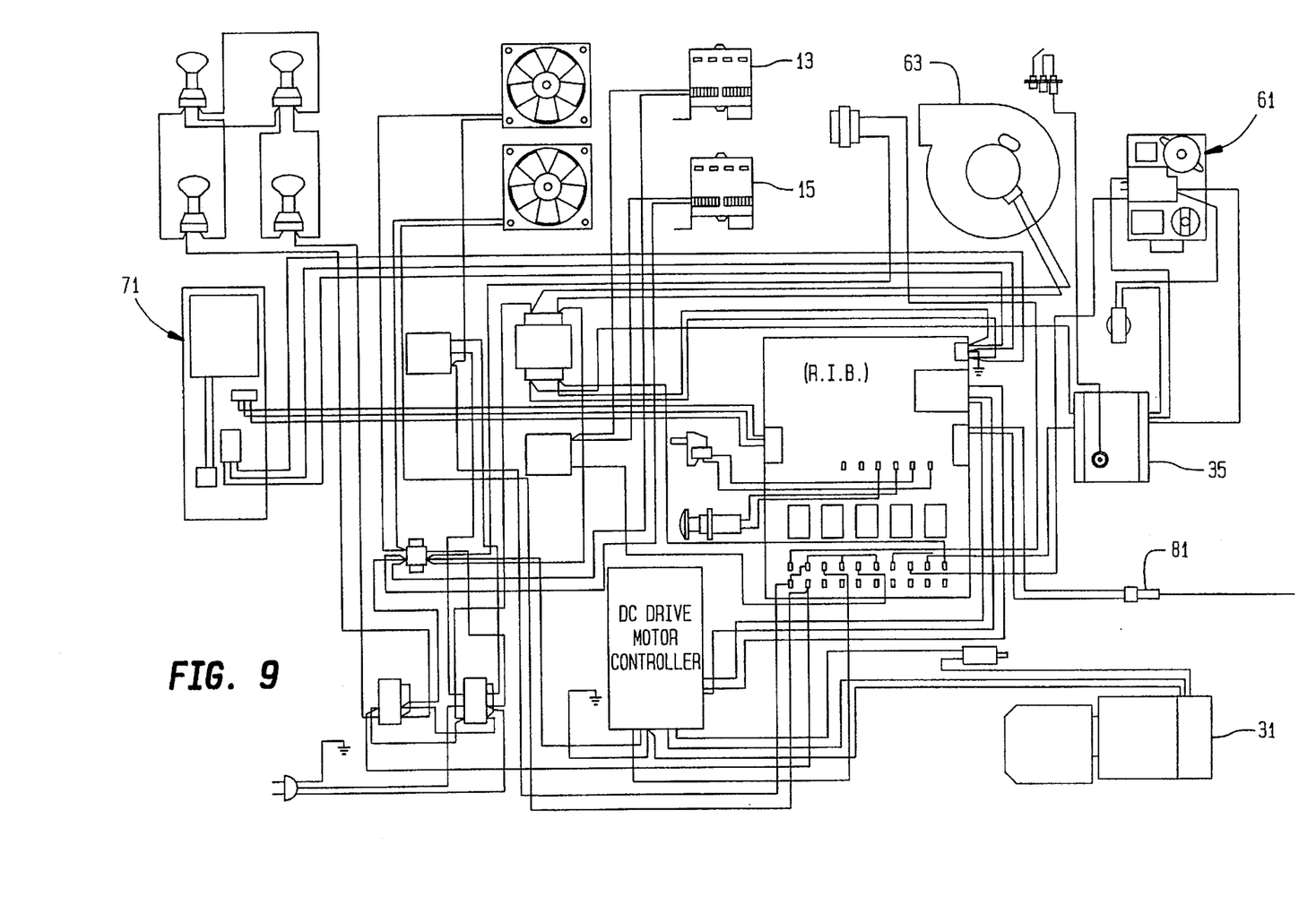
FIG. 9 is a schematic diagram of the rotisserie oven's electronic circuitry according to the preferred embodiment of the present invention.

Referring to FIGS. 6 and 9, a microcomputer 71 includes a central processing unit which may receive an input from a keyboard or input device 73 which may, for example, comprise a capacitative keyboard. Microcomputer 71 also contains a memory chip 72 for the purpose of storing predetermined cooking parameters such as cooking time and cooking temperatures for a variety of food products.

The control means 11 includes conventional power supply 75, D.C. reset circuit 77 for resetting the microcomputer 71 when renewing power in power supply 75, clock oscillator 79 for providing clock pulses to microcomputer 71, temperature sensor circuits 81 coupled to temperature sensor probe 67 for sensing the temperature of cooking chamber 3, planetary assembly circuit 83 for providing power to planetary assembly 5, audible alarm 85, alpha/numeric display 87 and indicator lights 89. Control means 11 also includes an input status circuit 91 which may, for example, be responsive to a door switch which is indirectly electrically connected to microprocessor 71. Microprocessor 71 controls output relay circuits 93 which may, for example, control cooling fan circuit 95, convection fan motor circuit 97, infrared gas heating means circuit 99 and venting damper circuit 101.

Cooking is performed within cooking chamber 3 by a gas burner 12 that radiates infrared heat waves, planetary assembly 5 for rotating food products in cooking chamber 3, fans 13 and 15 for circulating convection air, as shown by arrows in FIG. 3, throughout cooking chamber 3 and a venting damper 9 for releasing excess energy, i.e., heat and other vapors such as moisture, contained within the atmosphere of cooking chamber 3.

Infrared gas burner 12 has a porous surface where gas combustion takes place in the infrared spectrum. Also, gas burner 12 may operate in at least two BTU input levels, namely high BTU input (i.e., 60,000 BTU/hour or greater) and low BTU input (i.e., 50,000 BTU/hour or less). During the early stages of the cooking process, gas burner 12 operates on high BTU input to compensate for energy loss from cooking chamber 3 due to opening of oven door 27 when the food products are loaded. Also, when food products are initially loaded into cooking chamber 3, they are generally cold and require substantial levels of heat to begin cooking. For example, raw chickens can tolerate extremely high doses of infrared heat or other types of heat until the surface coloring of the chickens is established (i.e., the coloring typically goes from yellow/white to tan during the high BTU input). Later, gas burner 12 is switched to a low BTU input during the middle and final cooking stages so that the internal temperatures of the food products may be raised without burning their outer surfaces. The color of the chicken will typically go from tan to dark brown during the low BTU input cooking. In addition, high BTU input is used to reach a particular oven temperature but a lower BTU input may be used to maintain that particular oven temperature.

The present invention includes air circulating means 13 and 15 which is capable of cooking meat or poultry in the rotisserie oven by convection air. As the food products are rotated within cooking chamber 3 by planetary assembly 5, gas burner 12 generates infrared heat waves toward the circulating food products. Convection air fans 13 and 15 which are disposed about the top of cooking chamber 3, draw cool fresh air from outside of oven 1 near the bottom front of cooking chamber 3 and thereafter circulate the cooled air passed gas burner 12 such that it is heated by the infrared heat waves generated from gas burner 12 and then forced downwards. Thereafter, the heated air passes over the food product, down the back wall to the bottom of cooking chamber 3 and then drafted back up to the top of cooking chamber 3 together with new incoming cool air. The present inventors have discovered that it is advantageous to delay the activation of convection air fans 13 and 15 for five (5) seconds before each burner ignition in order to allow the flame to stabilize before air is passed in front of burner 12.

Planetary assembly 5 has a plurality of rotatable skewers or spits 29 positioned in parallel about a central drum axle in which each spit 29 supports one or more food products. Each spit 29 is supported at its ends by an idler end drum assembly 30 and a drive end drum assembly (not shown). The drive end drum assembly includes a drive gear secured to its outer side and a plurality of pinion gears which engage the drive gear and attach to each spit. As D.C. motor 31 (shown in FIG. 2) rotates planetary assembly 5 about a horizontal axis corresponding to its drum axle, the drive gear operates to rotate the pinion gears to ensure smooth and even cooking of all food products mounted on spits 29. The planetary assembly 5 preferably includes eight stainless steel spits 29 such that four chickens or other food products may be held on each spit.

During operation, planetary assembly 5 may operate at a variety of rotational speeds. For example, the preferred embodiment operates at 1 to 3 rpm's. Planetary assembly 5 operates at a high speed when burner 12 is at high BTU input, and it operates at a medium speed when gas burner 12 is at low BTU input. Planetary assembly 5 operates at a low speed after the cooking process has been completed and the food product is being held in cooking chamber 3.

The programmable controller/timer system (i.e., control means 11) comprises a programmable semiconductor chip and touch pad which enables the operator of rotisserie oven 1 to easily change or store operating parameters, such as, cooking time, oven temperature and vent damper position in accordance with the size and type of meat or poultry to be cooked therein (i.e. load compensating control means). Programmable control means 11 is also capable of controlling the number of rotations per minute (rpm) of planetary assembly 5. Control means 11 controls the temperature of cooking chamber 3 by controlling the opening and closing of vent damper 9 without need to cycle burner 12.

Referring to FIG. 4, the preferred rotisserie oven has gas burner 12, damper 9 and convection fans (13, 15) positioned at the top portion of oven 1. Gas burner 12 has a rectangular box-shape that extends across the entire width of cooking chamber 3. Convection fans (13,15) include a pair of impeller (103,105) having corresponding motor cooling impeller radial fans (107, 109) positioned thereabove. Each set of blower blade disks (103,105) and radial fans (107, 109) are driven by respective rotational motors (111,113) which rotate in opposite directions to each other.

The present invention is concerned with reducing the amount of carbon monoxide which is formed due to the cycling (i.e., ignition and re-ignition) of burner 12 during the cooking or baking stages.

Figure 7:
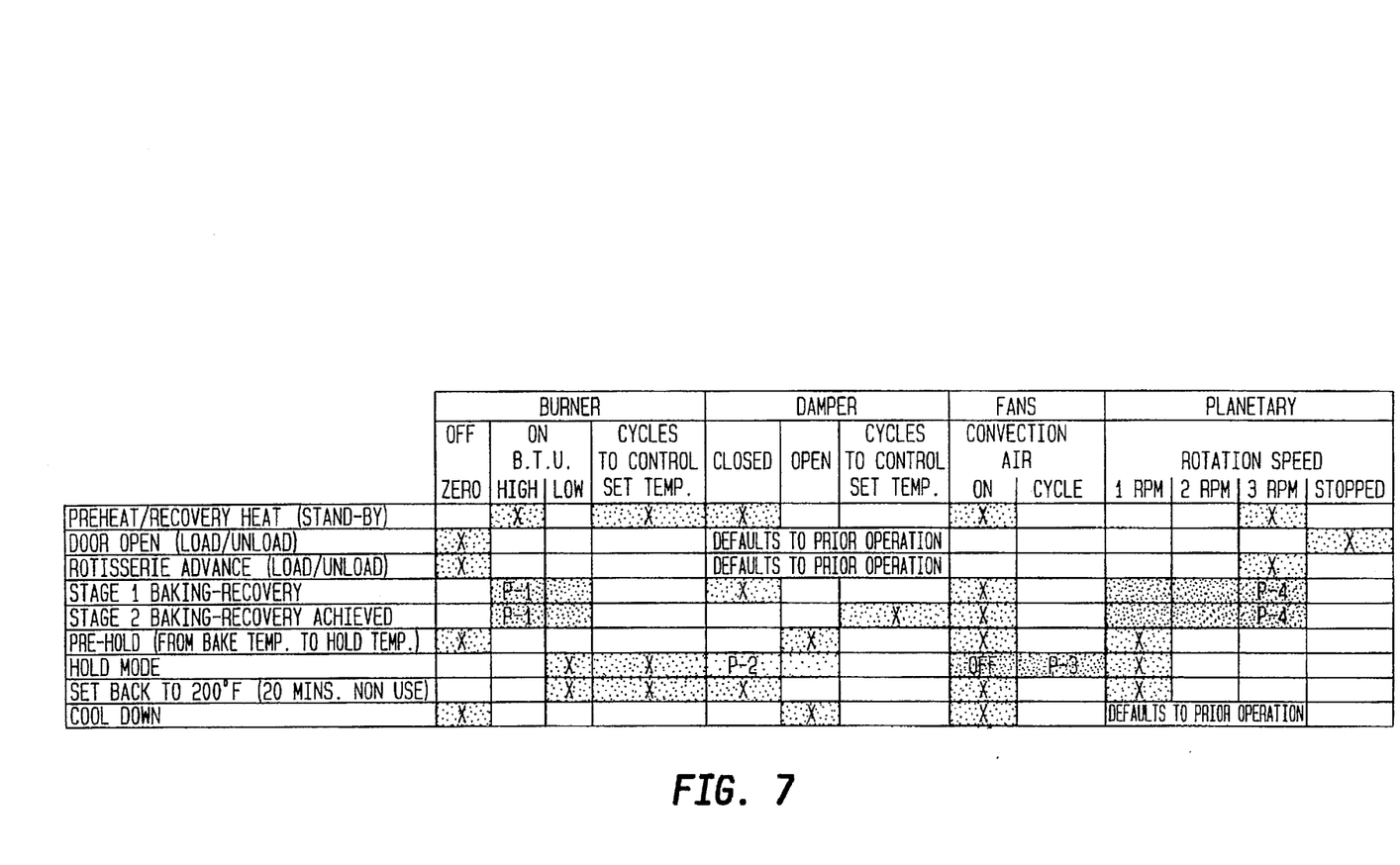
FIG. 7 is a chart illustrating the operational protocols provided by the control means of FIG. 6 for the burner, damper, convection fans and planetary assembly during the various preheating, cooking and cooling stages of the operating cycle of the rotisserie ovens of the present invention.
Figure 8A:
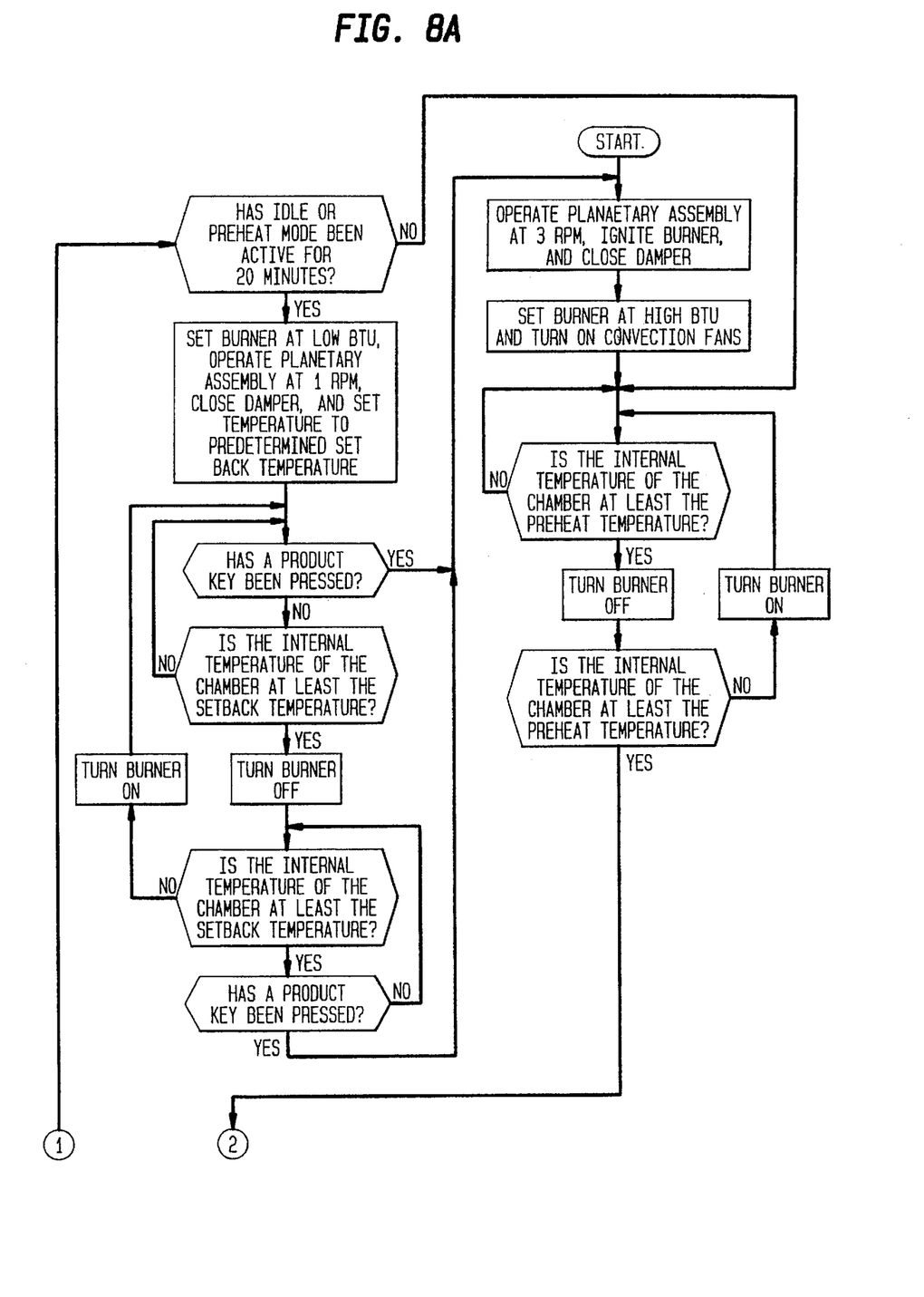
FIGS. 8A through 8C are flow charts illustrating the general operating instructions for completing one complete cooking cycle using the rotisserie control device according to the present invention.
Figure 8B:
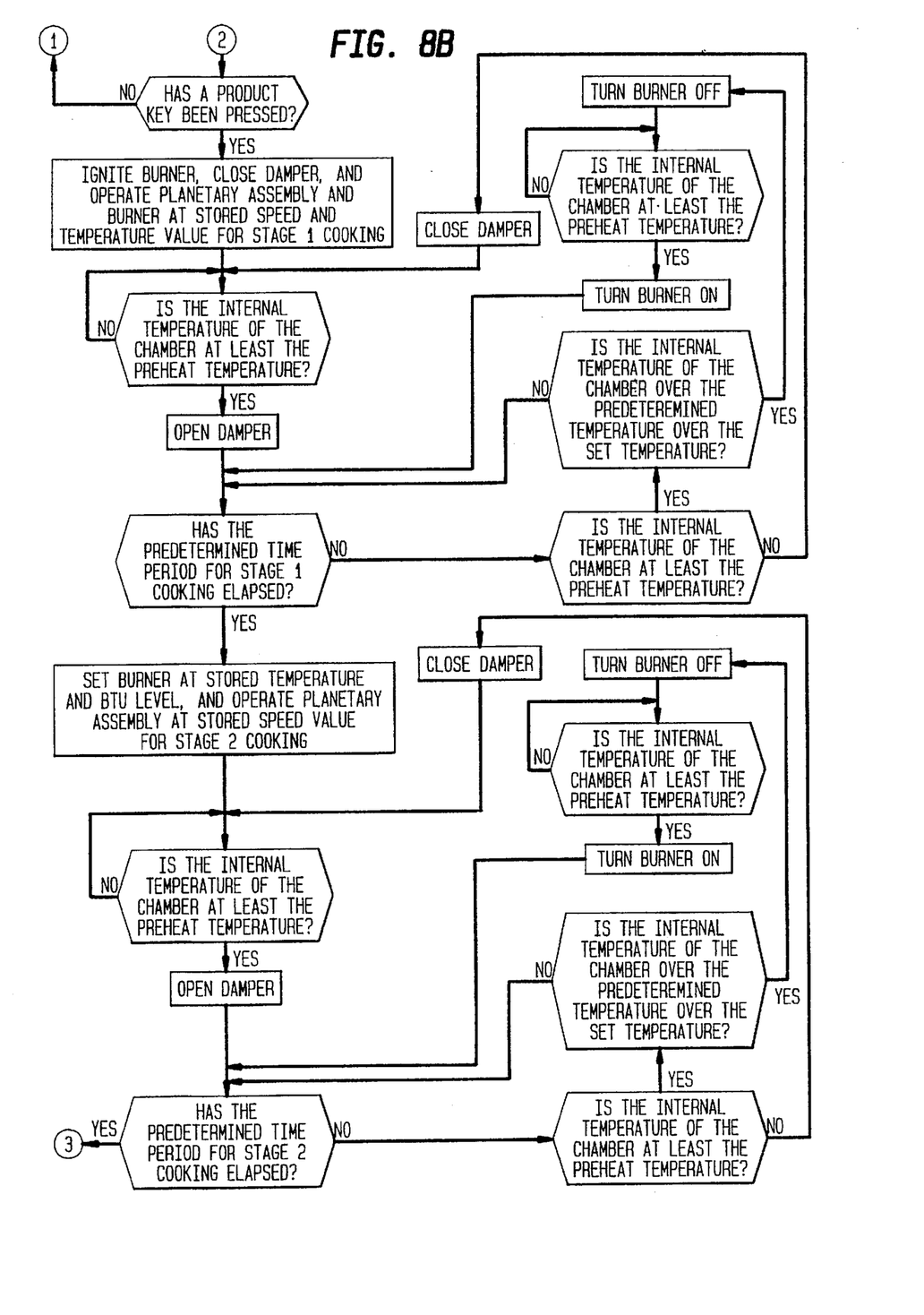
Figure 8C:
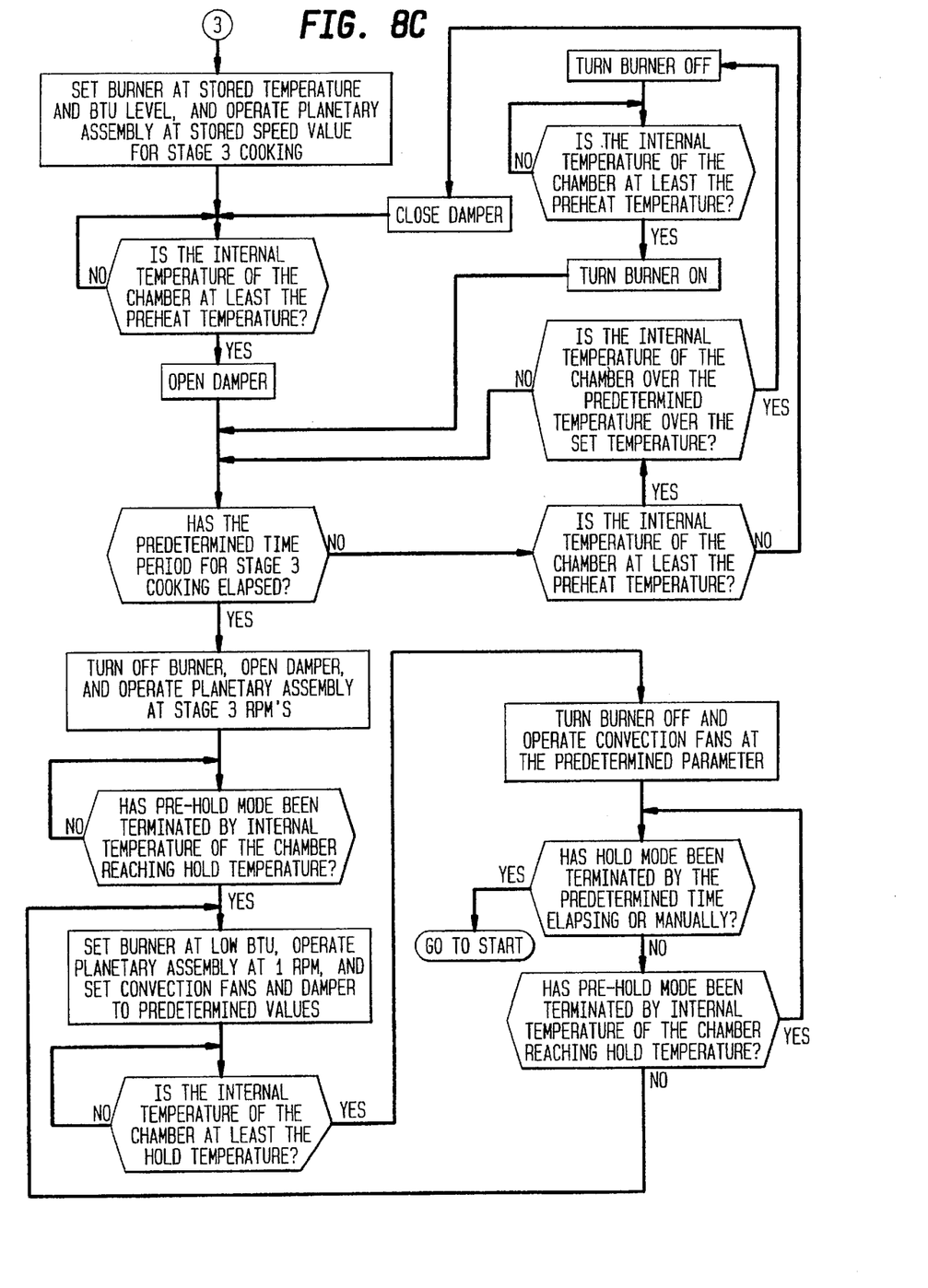
Figure 8D:
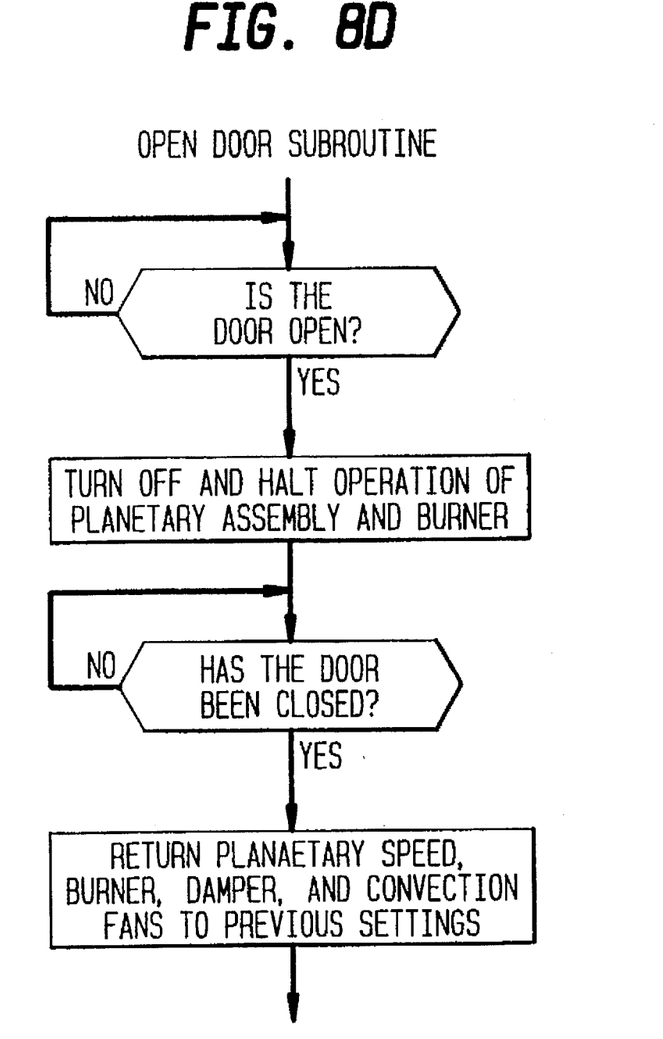
FIG. 8D is a flow chart illustrating the general operating instructions for the subroutine when the front door of the rotisserie oven is opened.

As shown in FIGS. 7–8D, a cooled oven is preheated by setting the burner at a high BTU input, e.g., 60,000 BTU/ hour or greater, closing the venting damper and operating the planetary assembly at 3 rpm's. The preheating stage continues until the temperature of the cooking chamber, as detected by the temperature sensor, reaches a predetermined preheat temperature (e.g., in the case of chickens a cooking temperature of 300° F. (149° C.) is preferable). During the preheating stage the fans which circulate convection air throughout the cooking chamber are turned to the "on" position.

Once the predetermined preheat temperature has been attained, the burner is turned off. The microprocessor then checks with the temperature sensor to determine if the cooking chamber is at the predetermined preheat temperature. If the cooking chamber temperature falls below the predetermined preheat temperature, then the burner is reignited and the temperature of the cooking chamber is continuously monitored until it again reaches the predetermined preheat temperature. So long as the cooking chamber is at or above the predetermined preheat temperature the microprocessor will continuously check to see if a product key has been pressed. If a product key has been not been pressed, then the microprocessor will determine whether or not the idle or preheat mode has been active for at least 20 minutes. If the preheat mode has been active for less than 20 minutes, then the microprocessor again checks the internal temperature of the oven chamber to determine whether it is at least the preheat temperature. If the preheat mode has been active for 20 minutes, then the burner is set at a low BTU, the planetary assembly is rotated at 1 RPM, the damper is closed and the temperature is set to a predetermined set back temperature. The microprocessor will then continue to monitor whether a product key has been pressed. If a product key has not been pressed, then the microprocessor checks to see if the internal temperature of the chamber is at least the set back temperature. If it is not the set back temperature, then the microprocessor again checks to see if a product key has been pressed. However, if the set back temperature has been reached then the burner is turned off and the microprocessor continuously seeks to determine if a product key has been pressed. When a product key has not been pressed and the internal temperature of the oven is not at least the set back temperature, then the burner is re-ignited and the set back temperature and product keys are continuously monitored as before.

FIG. 8D depicts the preferred subroutine that occurs when front door 27 is opened as is detected by door switch 32. Once the from door has been opened the burner is turned off, the venting damper defaults to the prior operation in the preheat stage (i.e., it remains in the closed position), the convection fans are turned off, and the planetary assembly is stopped. If the front door is closed the planetary, burner, damper and convection fans are returned to their settings prior to the opening of door 27.

Once a product key has been selected, the control means automatically enters stage 1 baking or cooking and follows the pre-selected cooking parameters (i.e., time and temperature) for the specific food product loaded therein.

During stage 1 cooking, the oven attempts to return to the predetermined cooking temperature as rapidly as possible. Therefore, the burner is re-ignited at a high BTU input and then the stored program instructs the burner whether to remain at a high BTU input or switch to a lower BTU input. The venting damper remains closed, the convection fans are turned on, and the planetary assembly is operated at a pre-selected stored speed. If the internal temperature of the oven is at least the preheat temperature, then the damper is opened. The microprocessor then determines whether the predetermined cooking time for stage 1 cooking has elapsed. If time has elapsed, then the program enters stage 2 baking or cooking.

During stage 2 cooking, the oven is operated in such a way that the microprocessor instructs the burner whether to change to either a high BTU input or a low BTU input. The venting damper initially remains closed, the convection fans remain on, and the planetary assembly is operated at a pre-selected stored speed. The microprocessor then determines whether the predetermined cooking temperature has been obtained. If the predetermined cooking temperature has not been attained, then the operating parameter remain as set forth immediately above. If, however, the predetermined cooking temperature has been attained, then the venting damper is opened to release heat in the form a excess energy contained within the atmosphere of the cooking chamber. The microprocessor then determines whether the predetermined time cooking time for stage 2 cooking has elapsed. If time has not elapsed, then the microprocessor checks the temperature of the cooking chamber to determine whether it is at or above the predetermined cooking temperature. If not, the venting damper is closed until the cooking chamber again reaches the predetermined cooking temperature. This cycling of the venting damper between opened and closed positions to regulate the temperature within the cooking chamber allows the oven to keep its burner on all during stage 2 cooking, thereby substantially reducing the amount of carbon monoxide produced within the cooking chamber during stage 2 cooking and avoiding the production of a pink, soggy chicken.

The same subroutine is followed for stage 3 cooking if a third stage is programmed into the overall cooking routine.

Once the predetermined cooking time for either stage 2 or 3 cooking has elapsed and if no input buttons are pushed by the operator 20-40 seconds after an alarm signal goes off indicating that stage 2 or 3 cooking has been completed, then the burner is turned off, the venting damper is opened, the convection fans are kept on and the planetary rotational speed is 3 rpm This allows the cooking chamber to rapidly lower its temperature from a cooking temperature to a holding temperature at which time the pre-hold stage is terminated.

After the pre-hold stage, the microprocessor instructs the oven to enter a hold mode or stage wherein the burner is set at a low BTU input and cycled on and off to maintain a predetermined hold temperature. At this point the food product has been fully cooked and sealed such that carbon monoxide will no longer have an affect on the coloring thereof. Also, the venting damper can be programmed by the microprocessor to be either in the opened or closed position. The convection air fans are programmed to cycle between on and off. The planetary continues to rotate at about 1 rpm. Two hours from the time that the hold mode or stage began it will terminate if there has been no intervening use for twenty minutes. Once the hold mode has terminated, then the microprocessor returns to the start of the operational routine set forth in FIGS. 8A and 8B.

The invention having been thus described with particular reference to the preferred forms thereof, it will be obvious that various changes and modifications may be made therein without departing from the spirit and scope of the invention as defined in the appended claims.

What is claimed is:

1. A cooking apparatus for automatically cooking and rotating a food product which comprises:

a cooking chamber;

a planetary assembly disposed within said cooking chamber which is capable of rotating said food product;

a heating means disposed within said cooking chamber for cooking said food product;

a venting means disposed within said cooking chamber which is capable of releasing excess energy contained within said cooking chamber;

means for detecting the temperature in said cooking chamber; and control means which is capable of cooking said food product for a predetermined cooking time and maintaining the temperature of said cooking chamber in accordance with a predetermined cooking temperature by means of controlling said heating means and said venting means such that said heating means remains in the "on" position during said cooking time while the venting means is opened and closed as necessary to maintain said predetermined cooking temperature.

2. The cooking apparatus according to claim 1 wherein said heating means is an infrared gas burner which is capable of operating an infrared wavelength of between about 3 to 4 microns at either a low and high BTU input, said high input being about 60,000 BTU/hour or greater and said low input being about 50,000 BTU/hour or less.

3. The cooking apparatus according to claim 1 wherein said control means is a microprocessor which is electrically connected to said planetary assembly, heating means, venting means, and means for detecting a temperature in said cooking chamber.

4. The cooking apparatus according to claim 3 wherein said microprocessor is capable of storing a predetermined cooking time and predetermined temperature for various food products.

5. The cooking apparatus according to claim 3 wherein said venting means comprises a venting conduit disposed between said cooking chamber and the environment outside of said cooking apparatus, a solenoid, a damper shaft and a damper disposed on said damper shaft such that said damper is movably disposed within said venting conduit.

6. The cooking apparatus according to claim 5 wherein said microprocessor is electrically connected to said solenoid, whereby said damper shaft is axially moveable so that said damper can be moved to either an opened or closed position within said venting conduit.

7. The cooking apparatus according to claim 1 further comprising a means for circulating heated air within said cooking chamber.

8. The cooking apparatus according to claim 7 wherein said means for circulating heated air is electrically connected to said control means, whereby said control means is capable of turning said means for circulating heated air on and off.

9. A process for automatically cooking and rotating a food product disposed within a cooking means which comprises a cooking chamber, a planetary assembly disposed within said cooking chamber which is capable of rotating the food product, a heating means disposed within said cooking chamber for cooking said food product within a predetermined cooking time, a venting means disposed within said cooking chamber which is capable of releasing excess energy disposed within said cooking chamber, means for detecting a temperature in said cooking chamber, and control means capable of controlling each of the operations of said planetary assembly, heating means, venting means and temperature detecting means, wherein said process comprises the following steps:

loading said food product onto at least one support member which is rotatably connected to said planetary assembly;

rotating said planetary assembly at a predetermined speed of rotation; and heating said cooking chamber to a predetermined cooking temperature for a predetermined cooking time by continuously generating heat from said heating means and periodically adjusting said venting means between an opened and closed position, wherein said opened position allows excess energy from said cooking chamber to escape therefrom in order to maintain said predetermined cooking temperature; whereby cycling of said heating means between on and off positions during said cooking time is eliminated.

10. The process according to claim 9 further comprising the step of: preheating said cooking chamber to a predetermined preheat temperature prior to loading said cooking chamber with the food product.

11. The process according to claim 10 wherein said predetermined preheat temperature is maintained by cycling said heating means between on and off positions, while keeping said venting means in the closed position.

12. The process according to claim 9 wherein said heating means is an infrared gas burner which is capable of operating an infrared wavelength of between about 3 to 4 microns at either a low and high BTU input, said high input being about 60,000 BTU/hour or greater and said low input being about 50,000 BTU/hour or less.

13. The process according to claim 12 wherein said controlling means is capable of adjusting said heating means between said infrared wavelengths during said predetermined cooking time.

14. The process according to claim 9 further comprising a step of circulating heated air about said cooking chamber during said predetermined cooking time.

15. The process according to claim 14 wherein said step of circulating heater air about said cooking chamber is delayed for about five seconds after each ignition of said heating means.

16. The process according to claim 9 wherein said control means is a microprocessor which is electrically connected to said planetary assembly, heating means, venting means, and means for detecting a temperature in said cooking chamber.

17. The process according to claim 16 wherein said microprocessor is capable of storing a predetermined cooking time and predetermined cooking temperature for various food products.

18. The process according to claim 16 wherein said venting means comprises a venting conduit disposed between said cooking chamber and the environment outside of said cooking apparatus, a solenoid, a damper shaft and a damper disposed on said damper shaft such that said damper is movably disposed within said venting conduit.

19. The process according to claim 18 wherein said microprocessor is electrically connected to said solenoid, whereby said damper shaft is axially moveable so that said damper can be moved to either an opened or closed position.

* * * * *